Patented Oct. 13, 1942

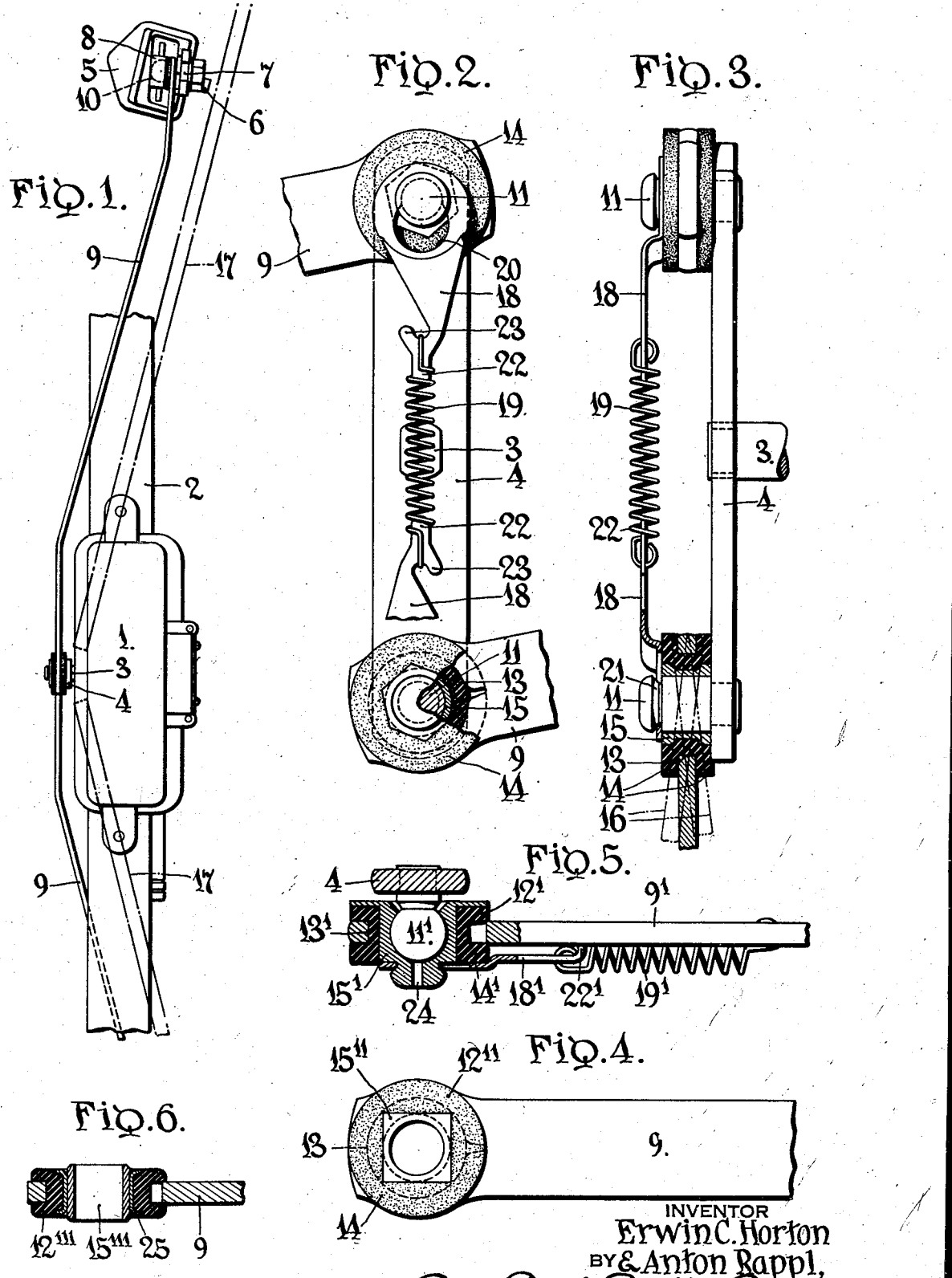

2,298,484

UNITED STATES PATENT OFFICE 2,298,484

WINDSHIELD CLEANER

Erwin C. Horton, Hamburg, and Anton Rappl, Buffalo, N. Y., assignors to Trico Products Corporation, Buffalo, N. Y.

Application July 26, 1940, Serial No. 347,750

6 Claims. (Cl. 15—255)

This invention relates to windshield cleaners and more particularly to the transmission of power from a motor or source of energy to a remotely disposed wiper actuating shaft.

In the present day motor vehicle in which the wiper shaft is mounted at the lower edge of the windshield the power is transmitted from the source of energy to the wiper actuating shaft by linkage having a reciprocatory motion. Consequently there is likelihood of misalinement of parts which might cause a binding in the power line, and by reason of the disposition of the wiper shaft on the cowl the noises of operation, incidental to backlash and play in the reciprocatory linkage, are amplified to an annoying degree.

It is the primary object of the present invention to provide an operating mechanism which will be more efficient and quieter in operation. The invention contemplates the embodiment of yieldable and sound absorbing means in the transmission line by which any slight inaccuracy in the mounting of the wiper shaft relative to the motor will be accommodated and by which the noise of operation will be kept to a minimum.

In the drawing

Fig. 1 is a diagrammatic view depicting the general arrangement of a windshield cleaner installation;

Fig. 2 is an enlarged front view of the motor or driving crank connection embodying the present invention;

Fig. 3 is a side elevation thereof, partly in section;

Fig. 4 is a fragmentary view of the link element thereof;

Fig. 5 is a like view of a modification; and

Fig. 6 is a cross sectional view through a further modification.

Referring more particularly to the drawing, the numeral 1 designates a source of energy, such as an oscillatory motor, mounted on a suitable support or frame member 2 and having an oscillating drive shaft 3 with a fixed crank arm 4. The numeral 5 indicates a cowl supported housing of a wiper shaft unit and in which is journaled a wiper shaft 6 and a connected intermediate shaft 7 which latter has a crank arm 8. Each crank arm is equipped with a pin and these crank pins are interconnected by a link member 9. The foregoing description is generally that of the present day windshield cleaner installation which is illustrated in principle by Patent No. 2,170,264, granted August 22, 1939.

The link connection with the pin of crank arm 8 is preferably effected through a ball and socket joint 10 by which the link is permanently joined as a part of the wiper shaft unit, the free end of the link element being detachable from the driving crank pin 11 to facilitate the installation of the windshield cleaner.

In accordance with the present invention means are incorporated in this line of power transmission between the drive shaft and the wiper shaft to accommodate any slight misalinement in the installation which may produce a binding in the linkage. Such incorporated means may be simply a cushioning element like, for example, a rubber grommet 12 inserted in an opening 13 in the free end of the link member, the grommet having flanges 14 overlying the opposite faces of the link member to secure it against unauthorized dislodgment and also prevent metal to metal contact between the link and the crank arm. The grommet has a central recess to receive the crank pin 11 and in order to secure greater wear this recess is provided with a hardened liner 15 which may be a spool-like sleeve of porous bronze having a polygonal cross section to interlock with the yieldable grommet body against relative rotation, the sleeve assuming a hexagonal cross section in Fig. 2 and a square cross section in Fig. 4 wherein the grommet 12" is formed to receive the hardened liner 15". The intermediate spool-like body may be reduced in diameter to interlockingly receive the grommet against axial displacement. The hardened liner sleeve will serve to limit lateral compression of the cushioning element while acting to hold the latter as the link member yields laterally in the soft body of the grommet due to any inaccuracy in the placement of the several parts. This permissive lateral movement of the link relative to the crank is indicated by the dotted showing 16 in Fig. 3. It is noted that the link embraces the soft grommet body opposite the reduced diameter of the liner so that the full cushioning benefit may be obtained. The grommet, in effect, constitutes a yieldable section or part of a composite link member.

When installing the cleaner mechanism, the wiper shaft unit is inserted through an opening in the cowl to dispose the wiper shaft 6 substantially at a normal to the windshield glass 17, following which the free end of the link with its cushioning grommet is engaged over the driving crank pin where it is secured by retainer plate 18. The illustrated embodiment is for dual wipers, the driving crank having two crank pins at opposite sides of the shaft axis and consequently the two retainer plates 18 may be jointed into a unit by a common positioning spring 19. Each plate has a key slot 20 engageable with a reduced seat 21 on the crank pin after which the plate is slid laterally to engage the seat in the narrow portion of the key slot where it is held by the spring tension. A positioning ear 22 on the retainer plate enters the coiled spring body to hold the plate properly poised and thereby facilitate the placement of the plate on the crank pin. The free end of the spring is engaged beneath a lateral hook 23 on the plate adjacent the positioning ear 22 and the included body portion is outwardly offset from the slotted portion, the latter seating on the stiff liner 15 so as to permit proper functioning of the grommet. The spring may be attached readily to the retainer plate by engaging its terminal loop over the hook 23 and springing the first spring coil over the positioning ear 22.

In the modified embodiment depicted in Fig. 5, an amplified degree of lateral movement of the link is permitted, the crank pin being in the form of a ball 11' for universal movement in a socket formed in the liner 15', the two parts being permanently joined in a manner to permit predetermined rocking of the liner over and above that provided by the cushioning grommet 12'. The grommet is held in place by the retainer plate 18' which has its positioning ear 22' deflected to bear against the link 9' as a support for the outer end of the plate. The spring 19' has its free end anchored directly on the link. The ball and socket joint may be lubricated through an orifice 24.

In Fig. 6 a further modification is illustrated wherein the rubber grommet 12''' has its center opening defined by an eyelet 25 which is clinched over the opposite faces of the grommet and itself receives a bushing sleeve or liner 15''' with a press fit so as to firmly relate the parts as a unit. The grommet unit is then mounted on the crank pin to freely rotate therein as in the previously described embodiments. The advantage of the eyelet and press fit embodiment depicted in Fig. 6 enables certain machine operations which facilitates the manufacture.

In both forms of the invention the link is permitted to yield laterally during reciprocation to accommodate for any untrue or unmechanical action, and while the foregoing description has been given in detail it is to be understood that the inventive principles here involved may assume other physical embodiments without departing from the spirit or scope of the invention as defined by the appended claims.

What is claimed is:

1. A windshield cleaner comprising a wiper, a wiper carrying arm, a wiper arm actuating shaft, a drive shaft having a crank pin, a reciprocatory power transmitting link operatively connecting said wiper arm actuating shaft and said crank pin and having an opening in one end, a soft rubber grommet arranged in the link opening, a relatively hard sleeve within the grommet rotatably receiving the crank pin, the grommet being yieldable to permit angular displacement of the link laterally of its path of reciprocation, whereby slight misalignment in the assembly of the parts will be accommodated for a smooth operation of the wiper arm and the transmission of objectionable operational noises is eliminated.

2. A windshield cleaner comprising a wiper, an arm carrying the wiper, an oscillatory shaft on which the arm is carried, a shaft spaced laterally from the oscillatory shaft, a crank fixed on one shaft, a reciprocatory link pivotally connecting the crank and other shaft, said link embodying a shock-absorbing yieldable section acting to absorb the shock of the sudden changes in direction of the link during its reciprocation and thereby cushion the whipping tendency of the wiper at the ends of its strokes.

3. A construction of the class described, comprising a crank pin, a link having a cushioning grommet receiving the pin, said grommet permitting the link to have angular displacement laterally of its path of operation, a relatively hard liner interlocked within the grommet and bearing on the pin, a retainer member slidably interlockable with the pin to hold the link in position, and a coil spring normally urging the retainer member in position, said member having a part extending axially into the body of the coil spring.

4. A construction of the class described, comprising a crank pin, a link having a cushioning grommet receiving the pin, said grommet permitting the link to have angular displacement laterally of its path of operation, a relatively hard liner interlocked within the grommet and bearing on the pin, a retainer member slidably interlockable with the pin to hold the link in position, and a coil spring normally urging the retainer member in position, said member having a part extending axially into the body of the coil spring and a second part over which the adjacent end of the spring is anchored.

5. A construction of the class described, comprising spaced crank pins, a link pivoting on each, a retainer interlockable with each pin to secure the respective link in place, and a coil spring connecting the two retainers, each retainer having a positioning ear extending axially into the body of the coil spring.

6. A windshield cleaner comprising a pair of spaced wipers, arms carrying at their outer ends said wipers, oscillatory shafts mounting the arms, a drive shaft having rigidly related opposed cranks, and a pair of links connecting the opposed cranks with the spaced oscillatory shafts for oscillating the wipers at the outer ends of the arms, each of said links having a shock absorbing yieldable section for absorbing the shocks of the sudden changes in the direction of its wiper at the ends of the wiping strokes and to cushion the whipping tendency incident to this sudden change of direction, the whipping tendencies of both wipers being coincidental with each other and acting through the yieldable sections on the rigidly related opposed cranks whereby the yieldable sections will mutually cooperate in absorbing the whipping tendencies of both wipers.

ERWIN C. HORTON.
ANTON RAPPL.